United States Patent [19]

Thomas et al.

[11] 4,266,810
[45] May 12, 1981

[54] PASSIVE SEAT BELT SYSTEM WITH GUIDE CLIP

[75] Inventors: Rudy V. Thomas; Robert L. Stephenson, both of Sterling Heights, Mich.

[73] Assignee: Allied Chemical Corporation, Morris Township, Morris County, N.J.

[21] Appl. No.: 62,082

[22] Filed: Jul. 30, 1979

[51] Int. Cl.³ .............................................. B60R 21/10
[52] U.S. Cl. ..................................... 280/802; 297/469
[58] Field of Search ............... 280/801, 802, 803, 804, 280/805, 806, 807, 808; 297/469, 468, 481; 24/78, 73 BB, 31 R

[56] References Cited

U.S. PATENT DOCUMENTS

| 3,827,713 | 8/1974 | Sakurai et al. | 280/803 |
| 3,860,261 | 1/1975 | Takada | 280/807 |
| 3,865,397 | 2/1974 | Pilhall | 280/803 |
| 3,889,971 | 6/1975 | Kazaoka | 280/804 |
| 4,175,773 | 11/1979 | Miller | 280/808 |
| 4,189,170 | 2/1980 | Tanaka | 280/802 |

FOREIGN PATENT DOCUMENTS 1398708  6/1975  United Kingdom ..................... 280/802

Primary Examiner—John A. Pekar
Attorney, Agent, or Firm—Roger H. Criss

[57] ABSTRACT

A passive seat belt system including torso and lap belts, wherein a guide clip is provided which is secured to one belt and permits the other belt to pass therethrough. The guide clip maintains communication between the belts and is especially useful with a two retractor system.

10 Claims, 4 Drawing Figures

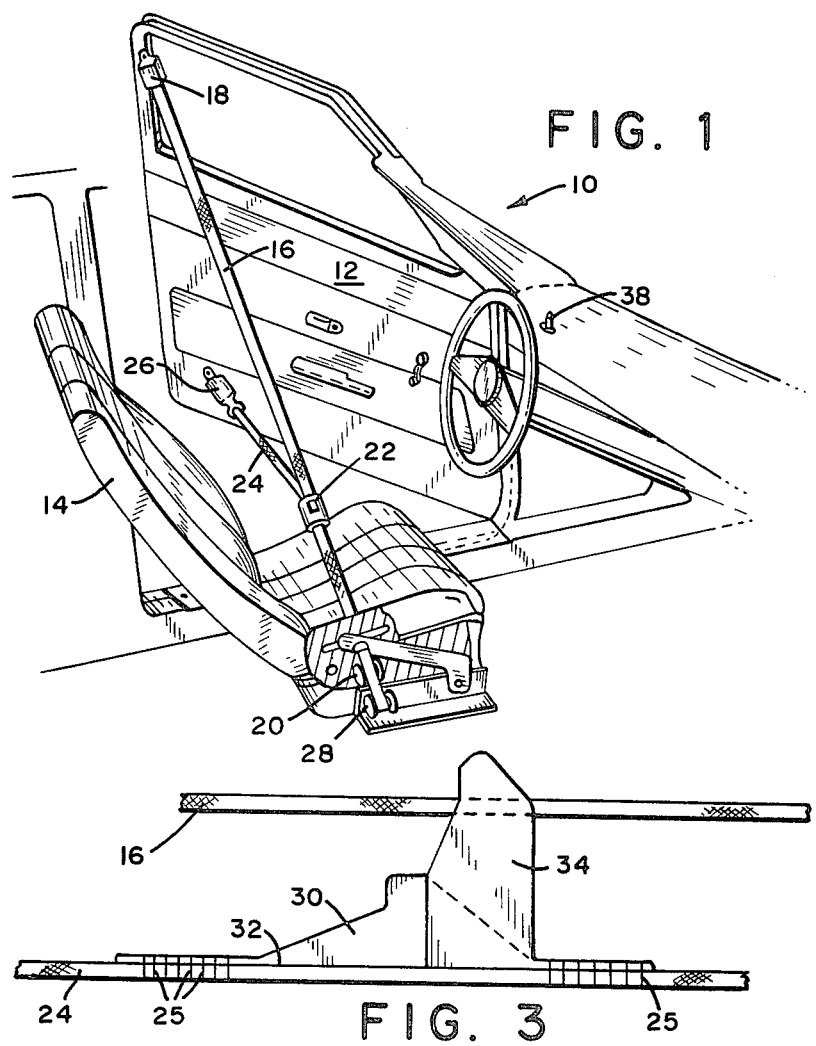
FIG. 1
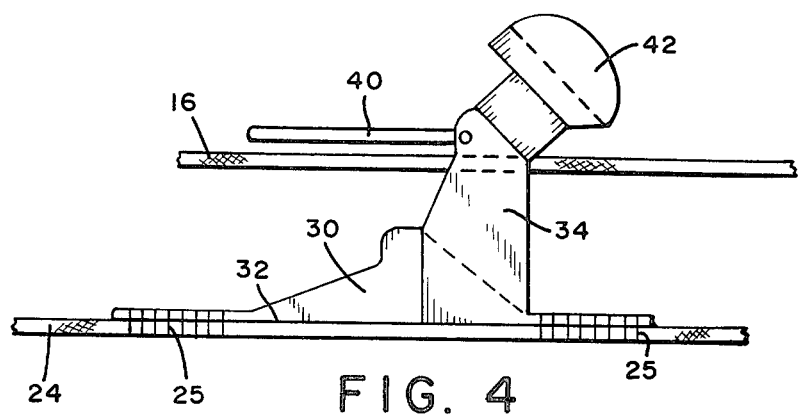
FIG. 3
FIG. 4

PASSIVE SEAT BELT SYSTEM WITH GUIDE CLIP

BACKGROUND OF THE INVENTION

1. Field of the Invention

This invention relates to passive seat belt systems for providing automatic crash protection to vehicle occupants.

2. Description of the Prior Art

Three-point passive seat belt systems have been suggested in which torso and lap belts are employed that automatically are moved to a position of use upon closing of the vehicle door. It has also been suggested to provide a passive seat belt system of the three-point type including a loop webbing on the door, which forms the torso and lap belts and which is connected through a locking junction ring to seat belt webbing stored on a single retractor. The junction ring permits movement of the webbing away from the occupant when the door is opened. It would be desirable to provide a mechanism to facilitate positioning of the passive belts to their non-restraining positions while increasing the comfort and convenience of the system and permitting relative adjustment in the belts to accomodate different size occupants and different positions of the vehicle seat.

SUMMARY OF THE INVENTION

In accordance with this invention, there is provided in a vehicle passive seat belt system including a torso belt adapted to be positioned about the torso of an occupant and a lap belt adapted to be positioned about the pelvic region of the occupant, the seat belt being automatically positioned about the occupant, the improvement comprising:

junction means interconnecting the belts and permitting relative movement of the belts, the junction means including:

a first means secured to and fixed with respect to one of the torso and lap belts; and a second means spaced from said first means and communicating with the other of the torso and lap belts so as to permit the other belt to move with respect to the junction means.

The junction means is in the form of a guide clip which permits adjustment in one of the belts with respect to the other belt to accomodate different size occupants and different seat positions. The guide clip is especially useful in a passive belt system that includes separate retractors for the torso and lap belts, whereby both belts may be moved together to their non-restraining position, while at the same time providing additional comfort and convenience, as well as reduced loads on the individual retractors.

BRIEF DESCRIPTION OF THE DRAWINGS

FIG. 1 is a view of the passive seat belt system of this invention including the junction means.

FIG. 3 is a side view of the junction means of FIG. 2.

FIG. 4 is a side view of another embodiment of the junction means.

DESCRIPTION OF THE PREFERRED EMBODIMENT

Figure 2:
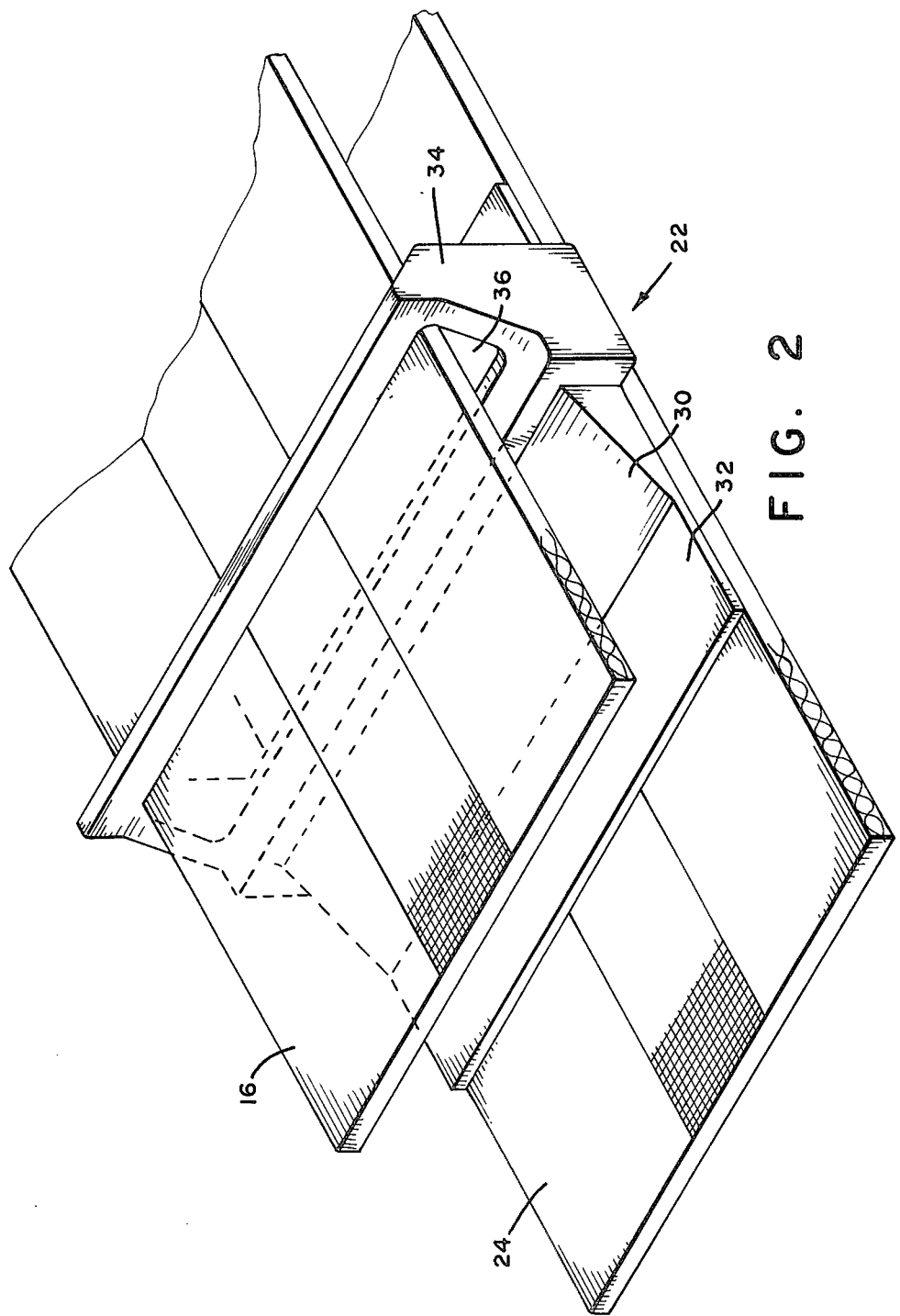
FIG. 2 is an isometric view of the junction means.

With reference to FIG. 1, there is shown a passive seat belt system, generally indicated at 10, in a vehicle which includes a door 12 and a seat 14. A torso belt 16 has one end mounted to door 12 through an anchor 18 and its other end connected to a retractor 20 located on the inboard side of seat 14. Torso belt 16 extends, through an intermediate portion thereof, through a guide clip 22 as described in detail below. A separate lap belt 24 has one end mounted to door 12 through anchor 26 and its other end connected to a retractor 28 also located on the inboard side of seat 14. Retractors 20 and 28 are of the emergency locking type and may be housed in a single frame attached to the vehicle floor or console adjacent seat 14 inboard of door 12. Preferably, anchors 18 and 26 are in the form of seat belt buckle and tongue assemblies which may be utilized for emergency release of the passive seat belt system. Alternatively, retractors 20 and 28 may be provided with a release mechanism to permit free spooling and thereby provide an emergency release from the system.

A junction means in the form of a guide clip 22 is secured to lap belt 24 intermediate the latter's ends. As shown in FIGS. 2-3, junction means 22 is fixed to lap belt 24 by stitching 25 or by adhesive, plastic anchors or the like so that the guide clip moves along with lap belt 24 as the latter is extracted and retracted from retractor 28. Preferably, the surface of lap belt 24 facing the occupant is relatively smooth at the area adjacent to stitching 25 so as not to become snagged on the occupant's clothing.

Guide clip 22 is in the general shape of an angle and includes a lower portion 30 having a planar surface 32 overlying lap belt 24. Preferably, planar surface 32 is coextensive with the width of belt 24. Extending generally normal to lower portion 30 is an upper portion 34 which includes a slot 36 through which torso belt 16 freely moves. Slot 36 is slightly wider than torso belt 16 and is spaced from lap belt 24 such that the belts are separated from one another. Since torso belt 16 is free to move through guide clip 22, the belts are free to independently be positioned about an occupant in seat 14 and can thereby adjust to different size occupants and seat positions. Guide clip 22 is preferably formed from a plastic material.

When door 12 is opened, as shown in FIG. 1, guide clip 22 assumes a position away from the inboard side of seat 14. This provides additional room for the occupant to enter the vehicle. When door 12 is closed, retractors 20 and 28 wind up excess webbing associated with torso belt 16 and lap belt 24, respectively. Due to the use of two retractors, the belts may be taken up, as well as extended, at different rates. As lap belt 24 is rewound, guide clip 22 is moved adjacent the inboard side of seat 14 to the occupant restraining position. Torso belt 16 moves through slot 36 as it is being rewound on retractor 20. In egressing from the vehicle, the occupant opens door 12, thereby moving guide clip 22 forwards and towards the door.

It is preferred that additional means be provided to move belts 16 and 24 to non-interfering positions in order to provide a larger area to facilitate ingress to and egress from the vehicle. For this purpose, one or more hooks 38 is provided on the dashboard of the vehicle. Thus, prior to exiting the vehicle, the occupant moves belts 16 and 24 forwards and places them into a stored position on hook 38. Guide clip 22 facilitates movement of the belts together.

Upon entering the vehicle, the occupant may manually release belts 16 and 24 from hook 38 whereupon the belts are retracted to their restraining positions as described above. Alternatively, an automatic releasing mechanism may be provided to free the belts from hook 38. For example, hook 38 may be pivotable upon actuation to a downward position whereby the belts are no longer maintained in their stored position. Such actuation may result from the occupant moving the gear shift selector out of the "park" position as would occur prior to moving of the vehicle. Mechanical interconnect means would thus be provided between the gear shift selector and hook 38.

The spacing of belts 16 and 24 provided by guide clip 22 also permits torso belt 16 to be fixed with respect to lap belt 24 so as to provide a comfort feature.

In the embodiment shown in FIG. 4, a lever 40 is pivotably mounted on upper portion 34 of guide clip 22 above the position of torso belt 16. Lever 40, which also may be made of plastic, is pivotable in a downwards, counter-clockwise direction to engage torso belt 16 and move it into contact with lap belt 24 to eliminate any annoying tension which otherwise may be present due to the rewind force of retractor 20. Thus, torso belt 16 may be manually moved into contact with lap belt 24 (or guide clip 22) to provide the desired comfort mechanism whereby torso belt 16 cannot move independently of lap belt 24. Such a comfort mechanism is disclosed in cofiled patent application Ser. No. 62,276 filed July 30, 1979.

In the event that it is desired to store belts 16 and 24 adjacent to the dashboard (or other location, such as door 12) using movement of guide clip 22, a ball-shaped button 42 is provided at the distal end of upper portion 34 of guide clip 22. Button 42 is adapted to be received in hook 38 provided in the dashboard of the vehicle. To facilitate egress from the vehicle, the occupant moves guide clip 22 forwards manually and connects button 32 into hook 38. It should be noted that any interfitting elements may be provided on guide clip 22 and the dashboard for retaining the belts in their stored positions. Also, a cable or wire means may be provided to automatically move guide clip 22 to its stored position. Button 38 may be manually removed from hook 38 when the occupant enters the vehicle, as described above.

In addition, torso belt 16 and lap belt 24 may be moved to their restraining and non-restraining positions by means of an automatic articulation device as shown in cofiled patent application Ser. No. 62,277 filed July 30, 1979.

The guide clip of this invention thereby provides additional entry and exit space in a three-point passive seat belt system. Additional comfort and convenience is afforded by permitting one belt to move and the other belt to remain stationary. Furthermore, separate retractors may be provided without reducing the area of free movement for ingress and egress, which thereby reduces the retractor load as opposed to a single retractor system.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. In a vehicle passive seat belt system including a torso belt having one end attached at an upper location of a door of the vehicle and an opposite end attached to said vehicle on the inboard side of a seat located adjacent said door, said torso belt being adapted to be positioned about the torso of an occupant in said seat and a lap belt having one end attached at a lower location on said door and an opposite end attached to said vehicle on said inboard side of said seat, said lap belt being adapted to be positioned about the pelvic region of the occupant; said belts being automatically positioned about said occupant, the improvement comprising:

junction means interconnecting said belts and permitting relative movement of said belts, said junction means including:

an integrally formed guide clip having a generally planar section extending over and secured in a fixed manner with respect to one of said torso and lap belts at a location adjacent the inboard side of said seat when said door is closed, and a leg section extending generally normal to said planar section and having a slot formed therein for receipt of said other of said torso and lap belts, whereby said other belt is permitted to move with respect to said guide clip.

2. The passive seat belt system of claim 1 including belt storage means provided in said vehicle, said junction means facilitating movement of said belts to said storage means to place said belts in their stored positions.

3. The passive seat belt system of claim 2 wherein said seat belt storage means is located on the dashboard of said vehicle.

4. The passive seat belt system of claim 3 including means to automatically release said belts from said belt storage means.

5. The passive seat belt system of claim 1 including means on said junction means for displacing one of said belts towards and into control with the other of said belts.

6. The passive seat belt system of claim 5 wherein said displacing means comprises a lever pivotably mounted on said junction means adjacent said second means for displacing said other of said torso and lap belts toward said one of said torso and lap belts.

7. The passive seat belt system of either claim 1 or 6 wherein said first means of said junction means is secured to said lap belt and said second means communicates with said torso belt.

8. The passive seat belt system of claim 1 including separate retractors for each of said torso and lap belts.

9. The passive seat belt system of claim 8 wherein the opposite ends of said torso and lap belts are attached to said retractors.

10. The passive seat belt system of claim 1 including connecting means on said junction means and adapted for connection to seat belt storage means in said vehicle, said junction means being movable for connection to said storage means to place said belts in a stored position.

* * * * *

UNITED STATES PATENT AND TRADEMARK OFFICE
CERTIFICATE OF CORRECTION

PATENT NO. : 4,266,810
DATED : May 12, 1981
INVENTOR(S) : Rudy V. Thomas and Robert L. Stephenson It is certified that error appears in the above-identified patent and that said Letters Patent are hereby corrected as shown below:

Col 4, line 42 (Claim 5): "control" should read - contact -.

Signed and Sealed this

First Day of September 1981

[SEAL]

Attest:

GERALD J. MOSSINGHOFF

Attesting Officer

Commissioner of Patents and Trademarks